June 1, 1943. G. M. CROFT 2,320,720
DEVICE RESPONSIVE TO CHANGES IN DENSITY OF LIQUIDS
Filed July 19, 1941 2 Sheets-Sheet 1
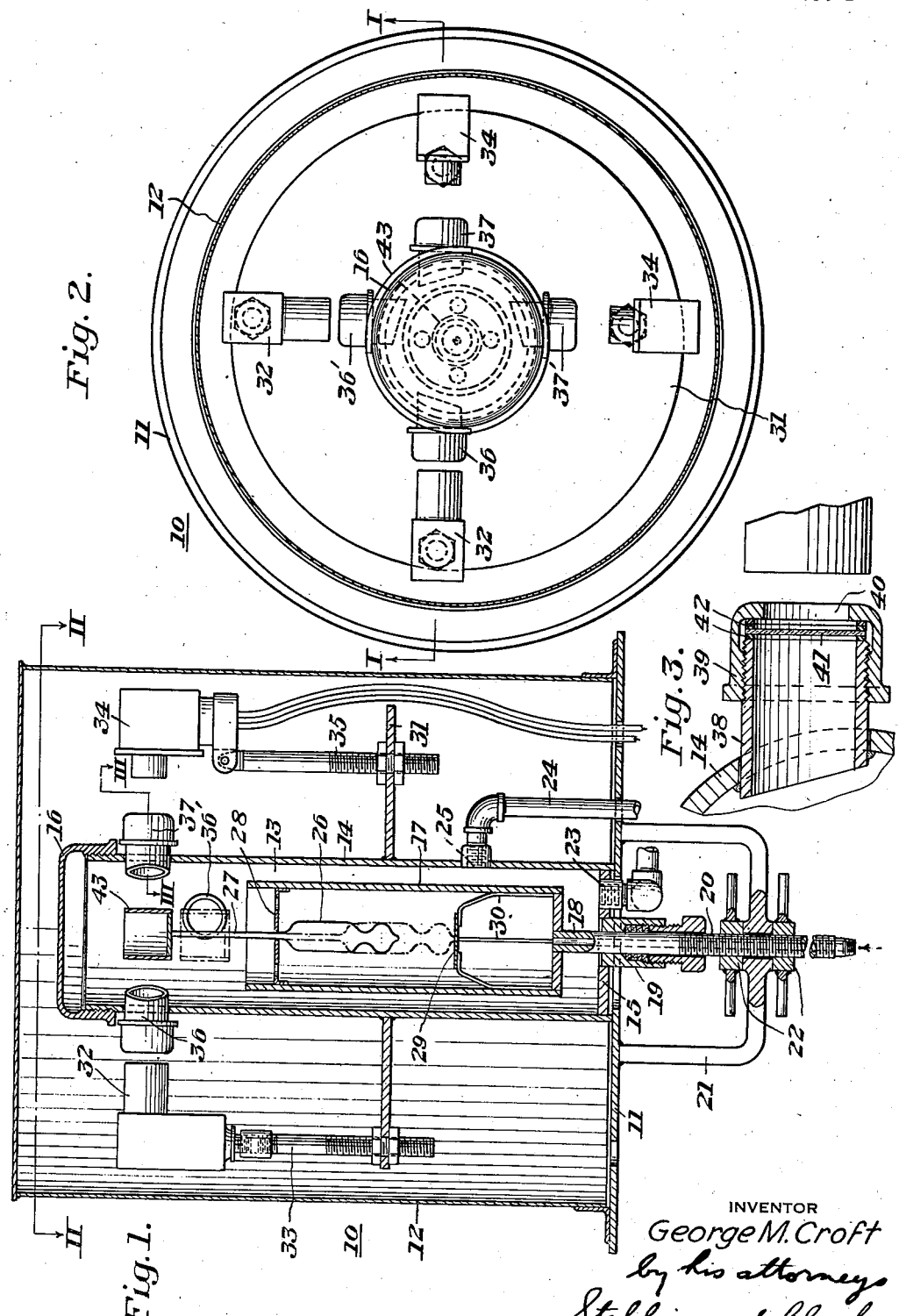
INVENTOR
George M. Croft
by his attorneys
Stebbins and Blenko June 1, 1943.   G. M. CROFT   2,320,720
DEVICE RESPONSIVE TO CHANGES IN DENSITY OF LIQUIDS
Filed July 19, 1941   2 Sheets-Sheet 2

INVENTOR
George M. Croft
by his attorneys
Stebbins and Blenko

Patented June 1, 1943

2,320,720

UNITED STATES PATENT OFFICE

2,320,720

DEVICE RESPONSIVE TO CHANGES IN DENSITY OF LIQUIDS

George M. Croft, Pittsburgh, Pa., assignor to Blaw-Knox Company, Pittsburgh, Pa., a corporation of New Jersey Application July 19, 1941, Serial No. 403,151

2 Claims. (Cl. 265—45)

This invention relates to devices responsive to changes in density of a liquid and more especially to a device in which the changes in density of a liquid within an enclosure may be observed or used for control purposes.

In carrying out various chemical and physical processes in which liquids are involved, it often is desirable to maintain a liquid contained in or flowing through a system in a nearly uniform condition of concentration, or to regulate the processes by the addition or removal of materials proportional to certain physical or chemical constituents in the treating liquid. In such cases it is important that variations in the liquid composition or the concentration of dissolved constituents therein shall be used for regulating purposes.

Under certain conditions where the treating liquid is a simple solution the concentration of the solute in the solvent may be the variable in accordance with which it is desirable to effect regulation; and in many cases such variation results in variability of the specific gravity of the solution and may be ascertained or registered by a hydrometer.

An object of this invention is to provide means by which a hydrometer in a liquid in a fully enclosed vessel, which may be under great or small pressure, may be used for automatic regulation of some process. The nature of the processes to be regulated or the mechanism of said regulation is not specific to the invention and such processes will not be described herein, but a case may be cited by way of illustration.

In my Patent 2,266,959, entitled "Gas dehydration," I have described and illustrated apparatus in which the concentration of an aqueous solution is regulated by circulating a portion of the solution through an evaporator, where substantially uniform temperature and pressure and consequently a substantially uniform vapor pressure are maintained. If, in that process, the solution is one in which the specific gravity at constant pressure and temperature varies with the concentration, this device could be used to replace the temperature regulating devices described in that application. Other uses for the device will be apparent to those familiar with the various chemical arts and industries.

A hydrometer which floats freely at the surface of a liquid furnishes a sensitive and very reliable means of indicating the density of the liquid. A hydrometer can be advantageously used for liquids in open vessels, but a procedure which would require the removal of samples and testing them out outside would not be practicable for an enclosed liquid, such as liquid carried by pipes and particularly at pressures other than atmospheric.

Attempts to use floats to register changes in density of liquids within enclosures have not been entirely satisfactory because of the requirements of mechanism actuated by the float which is subject to friction, sticking or other accidental derangements.

In measuring the density of a liquid in an enclosed system, I provide a chamber through which the liquid flows and which has an air or gas pocket into which the freely floating hydrometer may project above the surface of the liquid. The position of the hydrometer is observed through a window or windows, preferably by means of a so-called "electric eye" or photoelectric cell system which may be used for operating any suitable control. Since the hydrometer operates in a closed gas or air chamber above the liquid, the liquid may be subjected to pressures or changes of pressures above and below atmospheric. Since the hydrometer is freely floating, an exceedingly sensitive and absolutely reliable indication can be obtained continuously and at all times and difficulties with friction, sticking of contacts, etc., which are inherent in float-operated control systems, are obviated.

Further novel features and advantages of the invention will become apparent during the following detailed description of the present preferred embodiment outlined above which is shown in the accompanying drawings. In the drawings:

Fig. 1 is a sectional view taken on a vertical axial plane through the illustrated embodiment of my invention;

Fig. 2 is a horizontal sectional view with parts in plan, taken on the plane of line II—II of Fig. 1; line I—I of Fig. 2 indicates the plane on which the section of Fig. 1 is taken;

Fig. 3 is a partial section taken along the plane of line III—III of Fig. 1;

Figure 4:
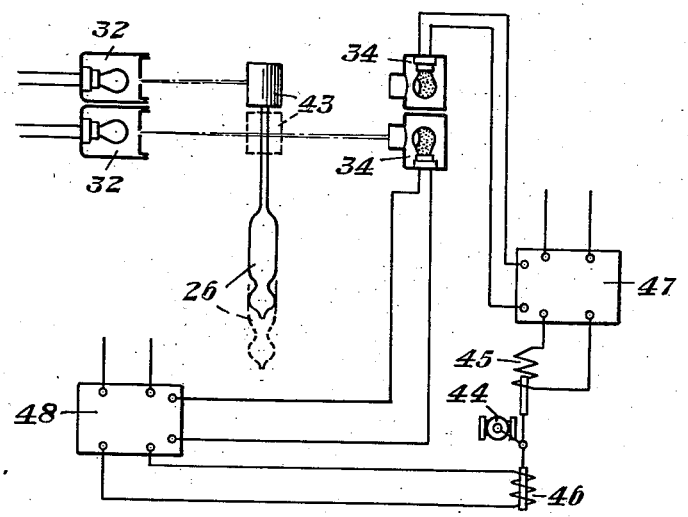
Fig. 4 is a diagrammatic illustration of one form of control circuit for which the device of my invention is adapted.

Referring in detail to the drawings, and for the present to Figs. 1 through 4, the device there shown, indicated generally at 10 includes a base 11 and a cover or housing 12. The base may be secured to any convenient support. An upstanding float chamber 13 is disposed on the base 11 and includes a tubular body portion 14, a bottom plate 15 and a cover or cap 16. An over-flow cup 17 is disposed within the chamber 13 and is supported on a pipe 18 extending through the bottom thereof, being welded thereon. The pipe 18 is slidable through a packing gland 19 welded in a suitable opening in the bottom plate 15. The lower portion of the pipe 18 is threaded as at 20 and extends through a suitable hole in a bearing yoke 21, the upper ends of which are welded to the base 11. Adjusting nuts 22 on the threaded portion 20 of the pipe 18 permit the latter and the cup 17 to be adjusted vertically.

The lower end of pipe 18 is connected by suitable piping to the pipe or tank or other part of the system containing the liquid the specific gravity of which is to be determined. An outlet 23 welded in a hole in the bottom plate 15 of the float chamber is connected to a return line. By these connections, liquid flows through the pipe 18 into the over-flow cup 17 and, when the latter is filled, runs over into the float chamber proper and out through the outlet 23. A slight pressure differential, of course, must be maintained between the inlet pipe 18 and the outlet 23 in order to cause circulation of liquid through the chamber 13. This may be provided by any suitable means such as a pump, or by gravity. The gas pressure within 13 may be as high or as low as required by the process in connection with which the device is used. A pipe line 24 extending from a port 25 welded in the tubular body 14 preferably communicates with a source of gas under a pressure equal to that at the surface of the liquid in the float chamber. Trapped air in the chamber 13 may act in the same manner as an air cushion in a water line and make it unnecessary to provide a separate source of gas under pressure.

A freely floating hydrometer 26 is disposed within the over-flow cup 17 and has a stem 27 freely slidable through a perforated guide disc 28 positioned in the cup near the top thereof. A baffle 29 is disposed between the hydrometer and the bottom of the cup, being supported on legs 30, to prevent the flow of liquid from the pipe 18 into the cup 17 from disturbing the position of the hydrometer.

The hydrometer may be observed directly or used to operate electrical control devices of any suitable type. For such purpose I employ electric eyes of known construction, mounted on the outside of the body portion 14 of the chamber 13 by means of an annular supporting plate 31 welded thereto. Each eye comprises a light source 32 mounted on a post 33 and a light-sensitive device 34 mounted on a post 35, the posts 34 and 35 being threaded for vertical adjustment on the plate 31 by nuts thereon. Each source 32 may conveniently comprise an incandescent lamp enclosed in a suitable housing, as shown in Fig. 4, and each light-sensitive device 34 may comprise a photoelectric cell similarly enclosed within a suitable housing. The details of the parts of the eyes are not material to the present invention and any type of such device as is commercially available may be used.

The body portion 14 of the float chamber has ports or windows 36 and 37 disposed in substantially diametrical opposition and in line with the source 32 and device 34 of one of the eyes. Similar ports 36' and 37' are positioned generally at right angles to the ports 36 and 37, at a level below the latter, and in alinement with the light source 32 and light-sensitive device 34 of the other eye.

Fig. 3 illustrates the structure of the ports 36 and 37, 36' and 37'. As there shown, each port comprises a short length of tube 38, the inner end of which is welded into a suitable opening in the tubular body 14 of the float chamber. The outer end of the tube 38 is threaded to receive a screw cap 39 having an opening 40 therein. A window 41 of transparent material is disposed between sealing gaskets 42 and is clamped against the end of the tube 38 by the overhanging outer end of the cap 39. It will be apparent that this construction provides sealed windows whereby light beams may be caused to pass through the float chamber 13.

The hydrometer 26 is provided with a screen 43 which may conveniently be a light cup or cylinder of sheet metal or other suitable material mounted on the upper end of the stem 27. The screen is so positioned on the stem and of such length that in an intermediate position it will intercept enough light from reaching both cells 34 to prevent either from operating. The elevation of the cup 17 is adjusted so that its overflow level will be such that the float will poise at this medial position when the specific gravity of the liquid is at the desired average value. If the specific gravity of the liquid increases sufficiently the hydrometer will rise, permitting light through 36' and 37' to actuate one of the photoelectric cells; while if the specific gravity of the liquid diminishes, light through 36 and 37 will actuate the other photoelectric cell. It is obvious that by proper proportioning and adjustment the range in specific gravity of liquid between actuation of the respective cells may be made large or small, as may be desired. The specific gravity may also be determined by a direct reading through the windows, if a suitable scale is mounted in the chamber 13.

Fig. 4 is a diagrammatic illustration of an electric circuit whereby the device may control either an indicator or means to regulate the specific gravity of the liquid. 44 indicates a control device, such as a valve, which may control mechanism for controlling the specific gravity of the liquid. For example, the valve 44 may be the valve in the gas supply to the boiler which is employed to evaporate water and thereby restore the specific gravity of a brine solution in the system of my Patent 2,266,959. The control device 44 is provided with solenoids 45 and 46 for operating it from one position to another. These solenoids are energized by the output of amplifiers or electronic valve systems 47 and 48, each of which is controlled by one of the photoelectric cells 34. The control device is preferably of such construction that it remains in the position to which it was last actuated until it is positively actuated to its other position. Where the device 44 controls apparatus for restoring the desired density of a liquid as, for example, by controlling the gas supply of a burner for an evaporator which removes water and thereby increases the density or concentration of a brine, the hydrometer 26 will rise when the desired density is restored and interrupt the light beam to the upper photoelectric cell and render the cell non-conducting and deenergize the solenoid 45. The lower photoelectric cell is then fully exposed and strongly illuminated and becomes conducting, so that the solenoid 46 is energized to operate the valve 44 and shut off the gas supply to the burner. As the brine then becomes diluted in use and the specific gravity falls below a predetermined point, the hydrometer descends to the lower position indicated in chain lines in Fig. 4. The upper photoelectric cell is then exposed to full illumination from its lamp and the lower photoelectric cell is shielded. This deenergizes the solenoid 46 and energizes the solenoid 45 to open the valve 44 to cause the evaporator to regenerate the brine. While I have mentioned one application of my device as controlling the regeneration of a brine, the device may be employed to effect other types of control whereby the liquid may be kept at a predetermined desired density or the device may control indicating instruments which indicate or record changes of density without serving to control the density of the liquid.

The adjustability of the over-flow cup 17 makes it possible to vary the specific gravity of the liquid at which the device 44 will be operated. In other words, the higher the cup 17 is adjusted, the lower the specific gravity at which the device 44 will be operated by the control device 10 and vice versa.

Figure 5:
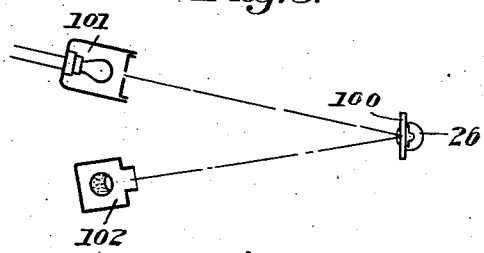
Figs. 5 and 6 are diagrammatic plan and elevation, respectively, showing a modification.
Figure 6:
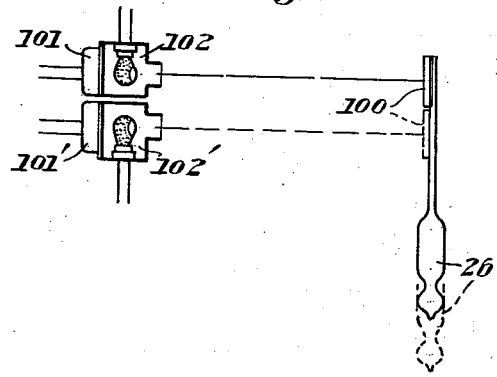

In Figs. 5 and 6 are shown, respectively, a plan view and elevation showing a modification in which a mirror 100 is carried on the hydrometer stem. The mirror, instead of interrupting the light beam, reflects the beam from a light source 101 to a photoelectric cell 102. When such a device is employed a single window through the chamber walls may be sufficient. As shown in Fig. 6, the mirror, when the hydrometer 26 is in its upper position, reflects the light from the source 101 to an upper photoelectric cell 102 and when in its lower position reflects the light from a lower light source 101' to a lower photoelectric cell 102', to effect a control like that illustrated in Fig. 4. While it is preferred that the light source and photoelectric cells be on the outside of the hydrometer-containing chamber and the position of the hydrometer be viewed through windows, the light sources, the photoelectric cells, or both, may be within the enclosure.

It will be apparent from the foregoing description and explanation that the invention provides a sensitive and reliable device responsive to the density or specific gravity of a liquid which may be in an enclosed system and by an enclosed system I mean one in which the liquid may be partially or fully enclosed, as distinguished from a liquid in an open vessel. The liquid in an enclosed system is generally at a pressure above or below atmospheric, and the device of the present invention will operate satisfactorily for liquids under high pressure, such as those of several thousand pounds per square inch. Although the hydrometer is completely enclosed and may be subjected to any desired pressure, the regulating devices actuated by it may be entirely outside of the enclosure and all adjustments may be made without access to the interior of the enclosure. The hydrometer is freely floating. Since the light beams in no way interfere with the free movement of the hydrometer, the device is very sensitive and reliable and not subject to mechanical difficulties encountered in the operation of valves, electric switches, etc., by means of floats.

While I have illustrated and described the preferred embodiment of my invention, it is to be understood that the invention may be otherwise embodied and practiced within the scope of the following claims.

I claim:

1. A device responsive to changes in the density of liquid in an enclosed system, comprising a closed chamber, an overflow cup in the chamber for holding a liquid pool, a pipe extending slidably through a liquid sealing means at the bottom of the chamber for supporting the cup therein, said pipe being connected with the enclosed system to supply liquid therefrom to the overflow cup, adjusting means engaging the pipe below the chamber for vertically adjusting the position of the overflow cup and thereby the level of the liquid pool with respect to the chamber, a hydrometer floating freely in the pool, and a window in said chamber through which the position of the hydrometer may be viewed.

2. A device responsive to changes in the density of the liquid in an enclosed system, comprising a closed chamber, an overflow cup in the chamber for maintaining a liquid pool therein, a vertically adjustable pipe extending through the bottom of the chamber for supporting the cup therein and connected with the enclosed system to supply liquid therefrom to the overflow cup, a hydrometer floating freely in the pool, a baffle in the bottom of the cup for preventing the flow of liquid from the pipe into the cup from disturbing the position of the hydrometer, and a window in the chamber through which the position of the hydrometer may be viewed.

GEORGE M. CROFT.